United States Patent [19]

Duncan IV

[11] Patent Number: 4,907,900
[45] Date of Patent: Mar. 13, 1990

[54] AUTO-REALIGNED PRINT CORRECTION

[75] Inventor: Howard C. Duncan IV, Ithaca, N.Y.

[73] Assignee: Smith Corona Corporation, Cortland, N.Y.

[21] Appl. No.: 698

[22] Filed: Jan. 6, 1987

[51] Int. Cl.[4] .................... G06F 11/00; G06K 3/00; G06K 7/00; B41J 5/30

[52] U.S. Cl. ........................ 400/63; 364/900; 364/943; 364/943.1

[58] Field of Search ... 364/200 MS File, 900 MS File; 400/697, 697.1, 63, 279, 697, 712, 83, 84,

[56] References Cited

U.S. PATENT DOCUMENTS

| | | | |
|---|---|---|---|
| 3,530,976 | 9/1970 | Higgason Jr. et al. | 400/6 |
| 3,786,429 | 1/1974 | Goldman et al. | 400/63 |
| 4,136,395 | 1/1979 | Kolpek et al. | 400/63 |
| 4,328,561 | 5/1984 | Convis et al. | 364/900 |
| 4,374,626 | 2/1983 | Hooker | 400/697.1 |
| 4,464,730 | 8/1984 | Lawrence et al. | 364/900 |
| 4,480,931 | 11/1984 | Kamikura et al. | 400/697 |
| 4,655,620 | 4/1987 | Adams et al. | 400/63 |
| 4,689,768 | 8/1987 | Heard et al. | 400/63 |
| 4,775,251 | 10/1988 | Suzuki et al. | 364/900 |
| 4,789,255 | 12/1988 | Hays et al. | 400/63 |
| 4,799,811 | 1/1989 | Beck et al. | 400/279 |
| 4,818,125 | 4/1989 | Sakai . | |
| 4,842,428 | 6/1989 | Suzuki | 400/63 |

*Primary Examiner*—Thomas M. Heckler
*Assistant Examiner*—Rebecca L. Rudolph

[57] ABSTRACT

A word-processing system or memory typewriter has the usual keyboard, input display and printer, including a correction ribbon for removing erroneous characters from a document held in the printer; together with a spelling dictionary stored within the memory, an error indicator activated upon entry of an incorrect word, and correction information and controls also stored in memory for amending the incorrect word into a trial word which matches one stored in the above-mentioned dictionary. For greater efficiency and ease of use by the operator, if the trial word is satisfactory when displayed, pressing the usual return key on the keyboard signals the system to print that trial word in place of the incorrect word on a printed document, only the erroneous characters being replaced so as to minimize use of the correction ribbon and the print ribbon in unnecessary removal and replacement of valid characters in the incorrect word. If the trial word is longer than the incorrect word, printed text between the incorrect word and the end of the line of text may need removal and replacement. In that case, the above-mentioned pressing of the return key causes an entirely automatic sequence which first removes that printed text, but saves it in storage, then performs correction of just the erroneous characters of the undesired word, followed by printing of the additional characters of the trial word, and finally recalls the saved text and reprints it in proper alignment with the previous automatic entries.

12 Claims, 2 Drawing Sheets

AUTO-REALIGNED PRINT CORRECTION

Related Application(s)

The present invention is an improvement on the "dictionary" typewriter disclosed in application Nos. 813,342 and 813,351 entitled "COMPACT SPELLING-CHECK DICTIONARY" and "SPELLING-CHECK DICTIONARY WITH EARLY ERROR SIGNAL", respectively; both filed Dec. 26, 1985 by R. W. Gray et al and assigned to the same assignee. These two applications are now, respectively, U.S. Pat. No. 4,782,464 issued Nov. 1, 1988 and No. 4,783,761 issued Nov. 8, 1988. It is also an improvement on the "dictionary" typewriter disclosed in application No. 869,777 now U.S. Pat. No. 4,782,464 issued Feb. 21, 1989 entitled "DICTIONARY MEMORY WITH VISUAL SCANNING FROM A SELECTABLE STARTING POINT" and filed Jun. 2, 1986 by Howard C. Duncan IV, et al with the same assignee; and lastly, that disclosed in application No. 07/000,700; now U.S. Pat. No. 4,797,855 issued Jan. 10, 1989, filed by Howard C. Duncan IV, et al Jan. 6, 1987 with the same assignee and entitled "ADAPTIVE SPELLING CORRECTOR".

FIELD OF THE INVENTION

The invention relates to word processors (or "memory" typewriters as they are sometimes called), which normally incorporate the capability of correcting any erroneous words in a last-entered group of words, such as a line, paragraph, etc. More particularly, it relates to those storing lists of commonly-encountered words to which reference can be made for various purposes (e.g. spelling, dictionary, thesaurus, etc.)

BACKGROUND

Correcting typewriters have long been known (e.g., patent No. 3,780,846 entitled "Automatic Erasing Typewriter" and filed by Robert A. Kolpek et al, which issued Oct. 9, 1973) which can remove incorrect characters and allow entry of correct ones by following an appropriate sequence of keystrokes. For example, backspacing to the end of an incorrect word, selecting an "erase only" mode if characters erased from a document are to be retyped subsequently, changing to an "erase and delete" mode where new characters are to be entered by the typist in place of one or more erroneous characters, and pressing a "retype" key when erased material stored in memory is to be recalled and reprinted.

In recent years, "Dictionary" typewriters have appeared on the market which contain a listing of over 50,000, say, correctly-spelled words stored in a read-only section of an electronic memory. An error detection unit monitors successive text entries and emits a visual or auditory signal when comparison of an entered word with the words in the "dictionary" shows disagreement with spelling of the entered word. The signal is an indication that spelling of the last-entered word should at least be checked in a printed dictionary. In more powerful versions where the typewriter has an associated display unit, the typist may then enter those initial letters of the incorrect word believed correct and cause a search of the dictionary to find successive, alphabetically-ordered "trial" words sharing the initial letters of the incorrect word (a "List Mode" as it has been termed), one of these trial words then being chosen to replace the incorrect word.

Recently, the market has likewise seen the advent of electronic typewriters with memories storing thesauri from which one can retrieve a succession of synonyms for replacement of an undesired word. Here too, correction of printed text has involved the typist's initiation of two or more steps to effect the desired result.

While the foregoing improvements have done much to enhance the quality of communications prepared by poor spellers, dull writers, etc., the efficiency of typewriter or word-processor use is still susceptible of further increase because of unproductive time associated with interaction between the typist and the text display—e.g. moving a type carrier (and/or cursor, if a display is used), selecting particular corrective modes while moving to a desired spot in the text and selecting other corrective modes at that spot, etc., after detecting the undesired word. This last may be an erroneous word with a typographical or other error in it or it may simply be a trite word.

Thus, printed text requiring replacement of one word by another should be revisable in a simple, fully automatic operation, ending with properly aligned text once again. Preferably, this occurs upon depression of just one key.

SUMMARY OF THE INVENTION

The invention provides for a word-processing system of the kind having operator input through a keyboard with a plurality of depressible keys, a printed output legible by the operator, including an undesired word and one or more characters subsequent thereto; a word list stored within the system, and controls in the system for producing from the undesired word a properly-spelled trial word based on the word list; in combination with means operable to amend the undesired word in said printed output into conformity with the trial word in response to depression of a particular one of said depressible keys, detection means sensing existence of a length disparity between said undesired word and said trial word, and further means responsive to sensed existence of said length disparity and automatically operable first to erase from said printed output said one or more characters subsequent to the undesired word, and then to return said one or more characters alignedly to said printed output after amendment of the undesired word thereon by said first-mentioned means.

According to a further feature of the invention, if the word list is a spelling dictionary, an incorrect word is located within a string of valid words, and a trial word based on the spelling dictionary is of different length than the incorrect word; then upon operator acceptance of the trial word—indicated by depression of a print control key—the valid words in the string following the incorrect word automatically are erased from the document (but not from memory), the erroneous characters of the incorrect word erased and corresponding proper characters of the trial word printed on the document in their place; and the erased valid words returned from the memory to the document in proper alignment with the trial word printed on the document.

Accordingly, it is an object of the invention to provide an improved memory typewriter or word processing system having fast, efficient, properly aligned replacement of undesired words from text printed on a document.

It is a further object of the invention to correct errors in printed text by use of program controls which not only automatically erase and replace valid words subsequent to an incorrect word when a disparity between the length of an incorrect word and that of a trial word is detected, but also make an intelligent decision as to the characters in the incorrect word which are actually in error when compared with a valid trial word, erasing and replacing solely those characters in the incorrect word on the printed document.

Other objects and features of the invention will become evident from a reading of the ensuing description taken in conjunction with the drawing.

Figure 1:
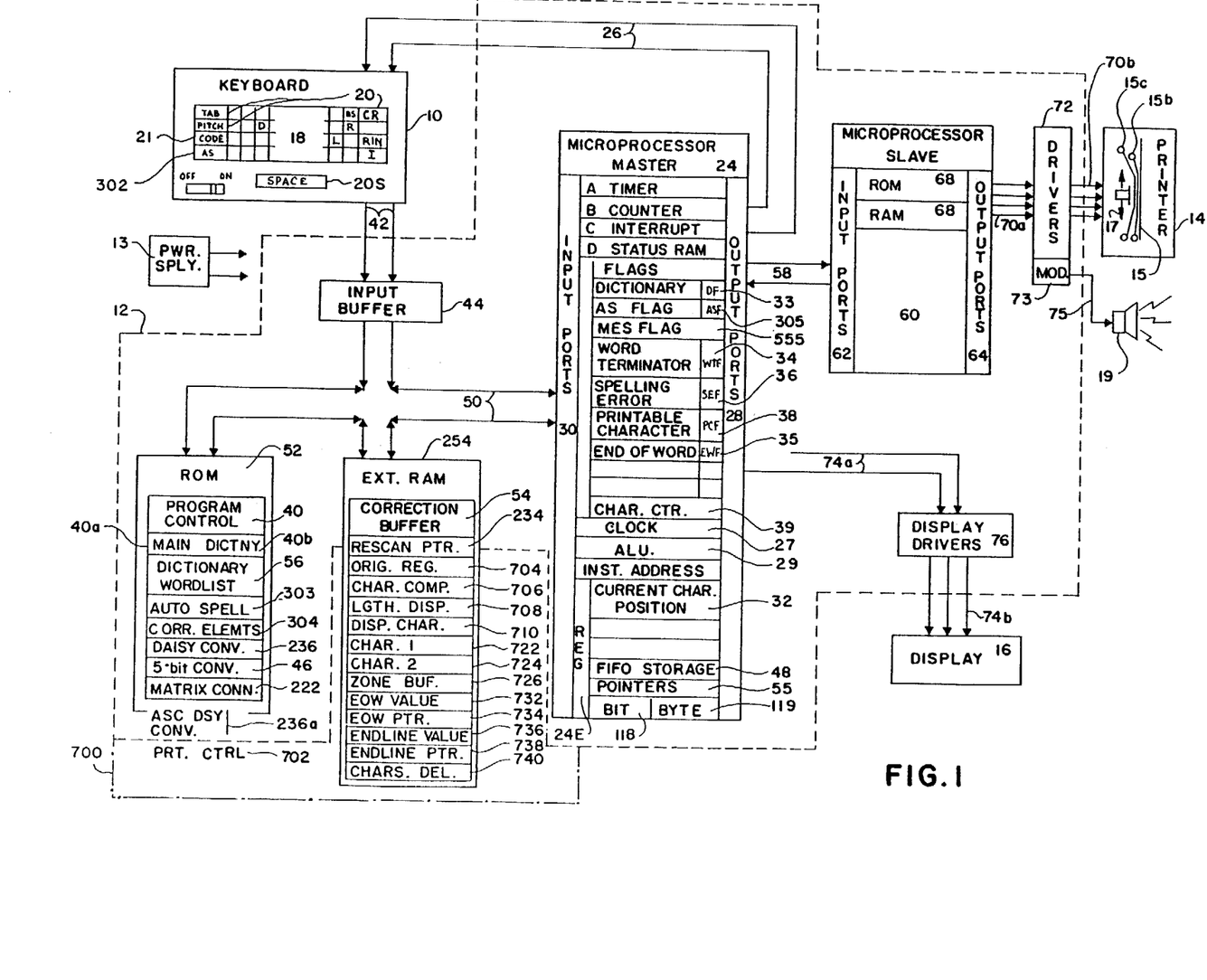
FIG. 1 shows a block diagram of a word-processing system or memory typewriter having a stored dictionary and, according to the invention, a fully automatic print correction control utilizing a trial word based on the dictionary content.

FIG. 1 is essentially similar to identically numbered figures in the above-cited applications termed References I to III hereinafter. Note that the first two cited have practically identical specifications and are therefore termed "References I" hereinafter for simplicity. It may also be noted that reference numerals are generally the same for like elements in the main figures of all the cited applications, but where elements are specific to the present invention or have been modified for purposes thereof, the reference numerals are three digits long and begin with the number 700.

DESCRIPTION OF THE PREFERRED EMBODIMENT

The invention will now be described as embodied in an interactive word information processing system 8 such as that shown in block diagram form in FIG. 1 which stores in its memory unit, a spelling dictionary 56 such as that disclosed in the previously identified patent Nos. 4,782,464 and 4,783,761 termed References I herein System 8 of FIG. 1 has four principal units comprising a keyboard 10, an electronic control circuit 12 (encircled by dashed lines), a printer unit 14 and a Print Correction Control 700 (an adjunct bounded by dot-dash lines at the bottom of FIG. 1).

According to the present invention, the Print Correction Control 700 provides an "Auto-Realignment" feature—i.e., a printed output corrector that permits automatic replacement of an original, "undesired" word detected by reference to the spelling dictionary 56. The undesired word may be an incorrectly spelled or mistyped word and the trial word may be a properly spelled word produced in the manner disclosed in Reference II or Reference III in conjunction with the above-mentioned Dictionary 56. The replacement is performed properly regardless of any disparity in length of the just-mentioned words relative to one another even if the printed text contains one or more characters (or, for that matter, one or more words) subsequent to the undesired word. This automatic replacement occurs in response to the typist's pressing of the carrier Return Key 20R on keyboard 10. Pressing of that key indicates that the trial word has been accepted by the typist as the one actually intended when the erroneous version was entered.

While the foregoing indicates that the invention is applicable to a system 8 having a spelling dictionary 56 as the word list, it should be noted that it is also applicable where that word list is a thesaurus or any other data-base providing a series of suitably arranged words exchangeable for a given original word. For ease and clarity of explanation, however, the specification will be couched solely in terms of correction of words containing one or more erroneous characters. The term "undesired" word is therefore to be considered hereinafter as including not only incorrect words having at least one error (several kinds being disclosed in Reference III), but also trite words replaceable by synonyms from a list in a thesaurus, and—in general—any word exchangeable with a related one in a data base of any kind.

When a word is misspelled or mistyped—the keyboard operator (typist) being notified of this by a warbling audible signal emitted by Device 19 (as disclosed in References I)—pressing Auto-Spell (TM) Key 302 ("A-S" key 302 hereinafter) upon reaching the end of the word (established by the typist's pressing of a Space Key 20S or other punctuation key as also disclosed in References I) causes appearance in Display 16 of an alternative or "trial" word—a correctly-spelled or "valid" word selected from those existing in Dictionary 56 in the manner disclosed in References I.

Figure 2:
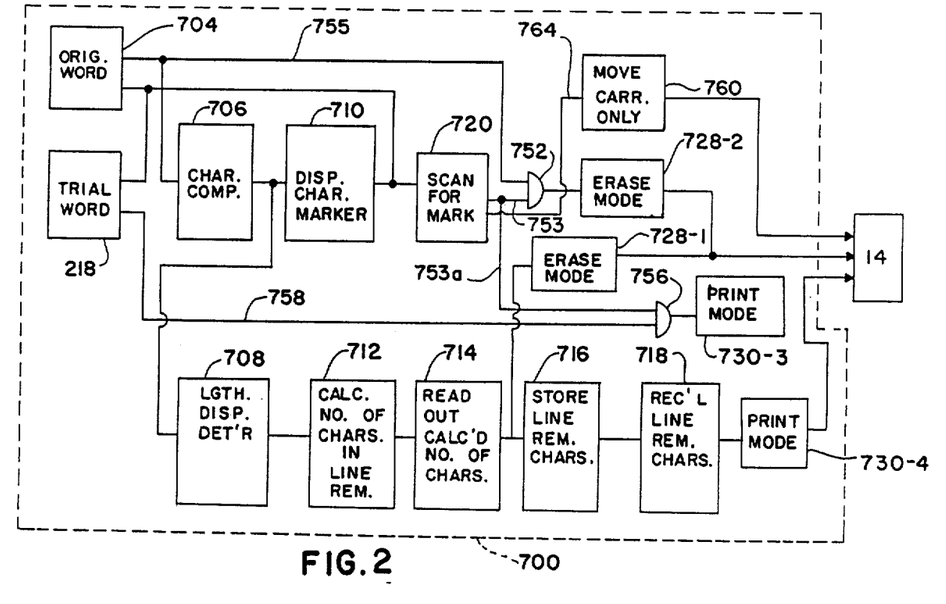
FIG. 2 is a block diagram showing the relevant operations providing the fully automatic print correction control of FIG. 1 and the sequence in which these operations are performed.

As shown in FIG. 2, the trial word formed by Auto-Spell System 300 is stored in a Register 218 (preferably the "Look-up Display" or LUD Register 218 of Reference II). If that word is not the desired one, then the typist may press an Index key 20I and each time this is done, another alternative word replaces that currently displayed. Pressing the Reverse Index key 20RIN causes the previously displayed word to be presented again.

Once the typist recognizes (or wishes to choose) a displayed word, the typist simply presses the usual Return key 20R and the erroneous word previously part of the text visible in Display 16 and on Document 15a (ordinarily a paper Sheet 15a, as termed hereinafter) is replaced with the desired word correctly spelled. Preferably, only erroneous characters of the original word are erased, intervening good characters not being erased and rewritten (as disclosed in Reference II) in order to save time and extend the life of the usual Correction Ribbon 15b in Printer 14. Where correction is made some words after the error and the replacement word has a length differing from that of the original word (determined by a Length Disparity Detector 708 in FIG. 2), the typist is notified by Display 16 that an "auto realignment" function is being invoked. "Auto Realignment" remembers the replacement word by storing it in Register 218, as stated above; and remembers the remainder of the existing line 725 (FIG. 3) by storing it in a Buffer Register 726 designated as "Zone Buf. 726" in (FIG. 1), while existing text on Line 15 of Sheet 15a (FIGS. 1 and 3) is automatically erased where necessary, leaving only the correct characters of the erroneous word. These erasures are represented by Erase Modes 728-1 and 728-2 (FIG. 2). Then, the text is reprinted with the correct characters of the replacement word properly inserted in place of the erroneous ones as shown by Print Mode 730-3, followed by recalling (per block 718) remainder 725 of Line 15 and printing that remainder, as shown by Print Mode 730-4.

At this point, it may be remarked that System 8 normally operates in one of three modes: Typewriter Mode, Line Mode and Memory Mode. In the first of these modes, system 8 behaves like a normal typewriter, characters being printed on Sheet 15a as they are entered on Keyboard 10. Pressing of A-S Key 302 (or Index key 20I thereafter) only enters alternatives on Display 16. When the desired word is seen on Display 16, the typist can press Return key 20R and cause Printer 14 to replace the original incorrect word on Sheet 15a with the correctly spelled word from Display 16. In Line Mode or Memory Mode, A-S Key 302 and Index Key 20I function in the same manner as in Typewriter Mode except for printing since corresponding text does not appear on Sheet 15a until Return Key 20R or the like has been pressed after Auto-Spell Program 303 has ended. The original word is merely deleted from memory and the replacement word automatically inserted in its place in Display 16 and Correction Buffer 54 of FIG. 1 in known fashion.

Before beginning a detailed description, a short overview of the system will be given (more complete details of the Dictionary portion may be found in References I). Keyboard 10 includes a normal set of symbol keys 18 and typewriter function keys 20, the former relating to printable characters, numbers and punctuation marks, etc.; and the latter relating to format control or other special function commands in the system. Some function keys 20 labeled in FIG. 1 include: Carrier Return (R), Backspace (BS), Index (IN), Reverse Index (RIN), Tab (TAB), Pitch (PITCH), Correct (CR), and Space (SPACE). A "Code" function key 21 (always operated in conjunction with one of the keys 18 or 20) serves to select an operative mode of the system, such as the "dictionary" mode previously disclosed. As described in Reference III, pressing A-S Key 302 initiates an automatic correction of an adjacent undesired word (an incorrectly spelled word, in this instance). As stated earlier it may also be a trite word for which a synonym is to be found in a Thesaurus word list, or an "exchange" word from a word list of the general type, and may be initiated by pressing an appropriate key.

Depression of any one of the various keys 18, 20, etc. on keyboard 10 operates a switch matrix (not shown, but known) scanned periodically by electronic circuit 12 in a known manner to generate a keyboard output signal uniquely related to the depressed one of the keys 18,20,21 or 302.

The three principal units 10, 12 and 14 of FIG. 1 interact in the usual fashion, manual selection of any desired typewriter operation being made at keyboard 10. Printer unit 14 is operated—in turn—under control of electronic circuit 12 for accomplishing the function selected by a keyboard input—such as, for example, printing a character corresponding to a selected character key 18 or corresponding to one or more correction characters supplied by, say, Auto-Spell (300), the automatic correction sequence of Reference III. Though preferably embodied in an electronic typewriter, the units 10, 12, 14 and 700 alternatively may comprise individual components combined in a manner common to many word processing systems.

Just as in References I-III, system operation is controlled here through a microprocessor 24 (a known electronic component located within the electronic control circuit 12) connected to keyboard 10 by bus lines 26. Master microprocessor 24 typically has output ports 28, input ports 30 and various electronic control elements including a number of storage registers. One example (others being identified subsequently) is a Current Character Position Register 32 which keeps track of the current character position in relation to a previous reference position along a type line 15 of printer 14 (a daisy-type impact printer for purposes of this description, although other kinds would be equally suitable) as the character information is printed on a paper Sheet 15a. A STATUS RAM 24D provides temporary storage of current keyboard information for known reference and recall purposes. In addition, STATUS RAM 24D provides for a plurality of FLAGS (known single-bit, two-state memory units, periodically interrogated as part of the machine's program routine). These include a Dictionary Flag 33, "Message" flag 555, and an Auto-Spell flag 306, for example. Only flags relevant to the invention are discussed herein though other known flags may also be present. RAM 24D also includes a byte 39 which functions as a Character Counter (software), being incremented by unity as each character of a word is entered.

Master microprocessor 24 periodically scans keyboard 10 to detect any key depressions. Detection of such causes a unique set of signals representative of the selected key (18,20,21 or 302) to be issued on lines 42 to a Buffer Chip 44.

Buffer Chip 44 transfers the set of signals to a FIFO storage section 48 where they are temporarily held until completion of processing a previous keyboard input. Each set is then fetched in the order of input under program control (see below), for decoding in known fashion to provide a daisy position code signal on a bus line 50 when the signal set held in FIFO section 48 originates from depressing a printable symbol key 18. Non-printable special function signals arising from depressing keys 20 (or keys 18,20 in combination with the Code Key 21) are also decoded in known fashion, but into Printer Format or other control data for subsequent processing.

As seen in FIG. 1, the printer code signals from FIFO section 48 appear on a bi-directional bus line 50 connected to a ROM 52 (Read-Only Memory), a RAM 254 and to input ports 30 of Master Microprocessor 24. In the instance of printable symbol key depression, the printer code signals are sent to RAM 254 for storage. ROM 52 includes not only the Program Control section 40 and Dictionary storage section 56 disclosed in References I, but also includes a Correction Element Storage section 304. Moreover, Program Control section 40 of ROM 52 contains a main program 40a, with necessary instructions to operate master microprocessor 24 in a prescribed manner (e.g. one similar to those known for control of "daisy-wheel" typewriters), together with a secondary set 40b of program instructions for a Spelling Check operation of the type in References I and a tertiary set 303 of program instructions for the automatic statistical correction operation of Reference III (Auto-Spell System 300, which utilizes the Correction Elements of Section 304). Dictionary storage section 56 of ROM 52 contains a multiplicity of addressable codes assembled to form words of a list used to verify the spelling order of characters upon release of printer decode signals from RAM area 54 of RAM 254 as described briefly below. Ram area 54 is identical to RAM 54 of References I and primarily functions as a correction buffer for keeping track of the last plurality of printable character inputs for orderly recall but is also used for text correction purposes of the present invention. Character inputs are stored in RAM area 54 in the form in which they are processed for printing and/or display under control of master microprocessor 24, this storage area 54 retaining all characters entered into a line such that they are available for purposes of correcting the text on Sheet 15a upon pressing of Return Key 20R under circumstances described subsequently. Area 54 is therefore referred to hereinafter as "Correction Buffer" 54.

Codes from internal or external memories (e.g. STATUS RAM 24D of master microprocessor 24, RAM 254) are communicated along the serial output channels 58 of master microprocessor 24 to a slave microprocessor 60 which has input ports 62 and output ports 64, a program stored internally in a ROM (Read-Only Memory) 66, and the current code data stored internally in a RAM 68, these code data being interpreted by the program in ROM 66 in usual fashion to supply control and drive signals to Printer Drivers 72 over lines 70. In turn, Printer Drivers 72 operate the printing components of Printer 14 (e.g. a daisy-type printwheel 17 supporting the printable characters). Similarly, Display Drivers 76 connected to master microprocessor 24 by lines 74a serve to operate Display 16 (via lines 74b) for visually presenting the last plurality of character inputs in known fashion. Display 16 may be operated in conjunction with or independently of Printer 14.

A brief general description relating to the basic operation of character input monitored by a spelling check as in the word information processing system 8 of FIG. 1, will now be given. Operator depression of a keyboard key (18,20,21) is detected in the previously-mentioned matrix scan. The unique signal set representative of the selected key is then sent to FIFO section 48 and stored until decoded by Microprocessor 24 as is known. If determined that the selected key is one of the printable character symbol keys 18, flag 38 is set, or if it is one of the function keys 20 (as possibly modified by simultaneous depression with CODE key 21) another flag such as Dictionary Flag 33 may be set. Each key input is released on a first in-first out basis in response to processing of all preceding key inputs, as stated earlier, and again appears on bus line 50. There it is applied essentially simultaneously to ROM 52 and RAM 254 by master microprocessor 24. In ROM 52, Program Control 40 is interrogated or read for appropriately operating master microprocessor 24 according to desired program routines in known fashion. The decoded signal from line 50 is also applied to Dictionary section 56 for a spelling check in the manner described in detail in References I. It should be mentioned, though, that the decoded signal sequentially stored in RAM area 54 is in the form of Daisy Position or Printer Format Codes too unwieldy for spelling check purposes, hence the necessary further code conversion is readily performed in known fashion by using the printer codes as arguments in a look-up table 46, likewise stored in ROM 52. The preferred code output from table 46 is a simple 5-bit binary expression of the alphabetic order from 1 to 26 for A to Z.

In most cases, upon entry of successive characters of a word by use of keyboard 10, Master Microprocessor 24 under direction of main Program Control 40a operates slave microprocessor 60 for ultimately processing each selected key function at printer 14 without incident into a corresponding succession of imprints on paper 15a. Should the typist strike a wrong key, however, the system's Dictionary 56 will detect this condition and emit a warbling signal through Device 19 of FIG. 1 to alert the typist, but that wrong character and any further characters entered are stored nonetheless in Correction Buffer 54 and printed on Sheet 15a.

As will be recalled, the order of entry of the characters of a given word upon sequential depression of the desired keys 18 is tracked in the one-byte software Rescan Pointer 234, the value in the byte being incremented by unity as each entry occurs.

The dictionary storage apparatus of References I is used herein preferably with the Auto-Spell System 300 according to the teachings of Reference III with respect to producing a trial word which is statistically likely to be the one intended. Dictionary storage section 56 contains a multiplicity of character address codes relating to particular characters and arranged to provide an alphabetical listing of words stored in known look-up tables (where each character is generally present in the five-bit binary code previously mentioned) and a character tree structure (where a compressed or "Huffman" code is used for higher order characters of long words).

One corrective procedure for producing a correctly-spelled word, upon entry of a word containing one or more errors is that incorporated, say, in the Smith Corona XD 7000 and the Smith Corona WP8 (or WP12), a dictionary typewriter and word processing system, respectively; both manufactured by the assignee. The dictionary structure of these machines essentially corresponds to that disclosed in References I and II. The latter discloses a "List Mode" initiated by simultaneous depression of Code key 21 and the "L" key 18L and brings out to printer 14 (or preferably to display 16, if present), the entered characters of a word—exclusive of the erroneous one and any which follow thereafter—together with the next character in the first of the alphabetically-ordered words of the listing which shares the correct ones of the entered characters—i.e. generally those prior to the erroneous character. If the operator does not believe that first word to be appropriate, a further succession of words having the like-positioned correct characters in common and being present in the listing, may be called by the operator's repeated depression of Index Key 20I and subsequently reviewed, if desired, by pressing Reverse Index Key 20RIN.

Another corrective procedure is that of Reference III. There, when the operator has been alerted of an error, the erroneous word is completed in the form which the operator believes most accurate, and A-S Key 302 depressed to bring about display of the properly spelled word which the operator most probably had in mind. In this process the entered (or "original") word is amended by successive application to the erroneous word of statistically-selected corrective information, each amended word being checked against the list in Dictionary 56 until a match with a valid word is obtained. The matching word (or "trial" word as termed herein) is then presented on Display 16. The same provisions are made as in the above-mentioned List Mode for obtaining further alternatives and reviewing these.

In either case, if the "trial" word is accepted by the typist's pressing of Key 20R then, according to the present invention, correction of text by proper realignment of any valid words which followed the incorrect word and deletion of erroneous or improperly positioned characters of the incorrect word, together with insertion of correct, properly positioned characters from the "trial" word is performed under automatic Print Control of unit 700, as will now be detailed. While the description which follows is generally based on use of the Auto-Spell system 300 of Reference III to supply a trial word, it must be kept in mind that the invention is not only applicable to the second version of Reference II, as stated previously, but is also applicable to use of any word list as a source of a replacement word in exchange for an original word on Sheet 15a which is undesired for any reason: misspelling, triteness, imprecision, etc.

Figure 3:
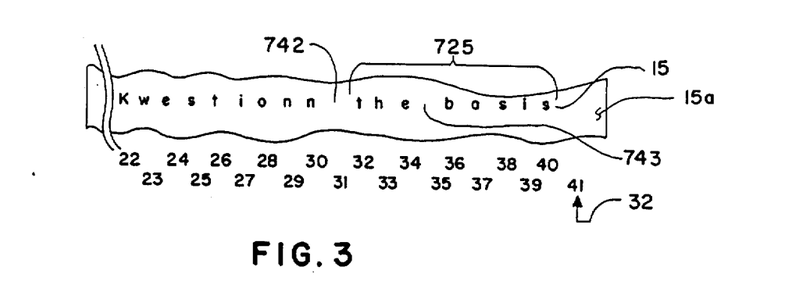
FIG. 3 is a pictorial diagram showing an example of an undesired word and additional valid words typical of text automatically corrected and realigned in accordance with the invention.
Figure 4:
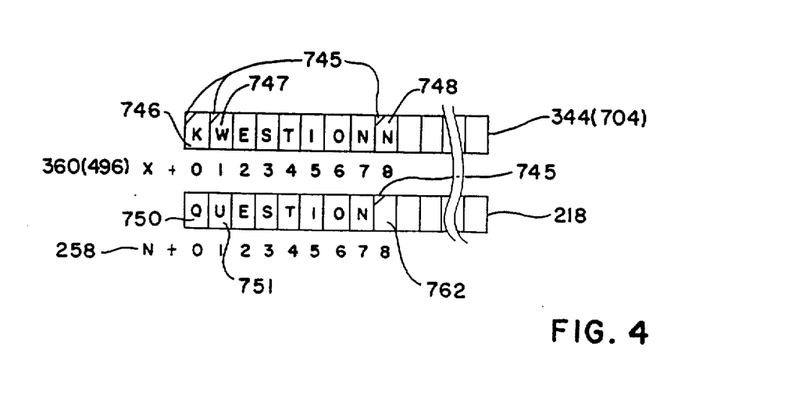
FIG. 4 is a schematic diagram showing the registers respectively storing the original word and the trial word accepted by the operator by pressing a print control key of the system keyboard in FIG. 1.

Having given an overall view, one may now turn to FIGS. 2 to 4 which illustrate the manner of correcting (exchanging) and automatically realigning erroneous printed text according to the invention. For purposes of this description of the invention, it will be assumed that system 8 is in Dictionary Mode and Auto-Spell Mode (simultaneous depression of Code Key 21 with D Key 18D and depression of A-S Key 302 having occurred earlier) and further that the typist has just pressed the Return Key 20R of Keyboard 10. Hence a trial word is present in LUD Register 218 and the incorrect word (referred to more generally hereinafter as the "original" word) from which the trial word was produced is preferably stored in a Special Register 704 (which has a capacity of 25 bytes and could be the Template Register 210 of Reference II, for example, if the present invention were applied to the second version described in that application) though it is also present in Template Register 344 (see Reference III). The reason for the duplication is that in order to achieve economy of high volume production, the same RAM chip 254 is used for both the machine providing the List Mode of operation and the machine providing the Auto-Spell Mode.

The first task performed according to the invention is the determination of the length of (i.e., number of characters in) the original word stored in Register 344 and that of the accepted trial word stored in Register 218. The reason for making this determination is that if the trial word in Register 218 has a length differing from that of the original word stored in Correction Buffer 54 and printed on Sheet 15a, then one or the other of Registers 218, 704 has excess characters which must be added to (or deleted from) Correction Buffer 54 and Sheet 15a. If the trial word in Register 218 is shorter, any characters or words present on either record medium (Correction Buffer 54 and Sheet 15a) beyond the end of the original word will need to be realigned to avoid undue gaps after correction of the incorrect word or, if longer, these same characters must be deleted temporarily from the printed Sheet 15a (by known "lift-off" or "cover-up" techniques) to permit proper insertion of additional printed characters of the accepted trial word into Line 15. For this purpose, a particular one of these two words is scanned at a time (the accepted trial word arbitrarily scanned first) and each character compared in turn with a "blank" code using the "Compare" function (CJNE command from the previously-mentioned known instruction set of Microprocessor 24). In both cases, the B Register 360 of Microprocessor 24 is used as a character counter, being set to ZERO initially, and DPTR 258 is set to the starting address of the particular register selected—i.e., "X" for Template Register 344 and "N" for LUD Register 218. That starting address designates the location of the first character of the respective stored word, as is known. The first character is then transferred to Accumulator 29a and compared with ZERO in five-bit binary code (00000). If not equal, Routine 702 increments B Register 360 and DPTR 258 such that next the second and further characters are transferred successively to Accumulator 29a and comparison with ZERO repeated, B Register 360 and DPTR 258 being incremented each time an inequality is the result.

The process continues in that fashion until equality is detected, signaling the end of the word in the register concerned (218 or 344). At that point, the count in B-Register 360 identifies the length of the respective word. If Template Register 344 was the one concerned, the count is stored in a one-byte "Char 1" Register 722. Conversely, if LUD Register 218 was the one concerned, the count is stored in an identical one-byte "Char 2" Register 724. It may be noted here that because LUD Register 218 is also used for output to Display 16, the characters stored in LUD Register 218 are preferably in form of the well-known ASCII code in which a "blank" corresponds to 20 (hexadecimal). This difference is of minor significance because it only involves a One in bit 5 of the eight-bit byte, a ZERO being present in bits 0 to 4, just as in the 5 bit code for a "blank" in Template Register 344.

Having determined the number of characters in the incorrect word and in the accepted trial word (stored in Registers 722 and 724, respectively, which form part of Length Disparity Detector 708 of FIG. 2), the number in Register 722 is next transferred to Accumulator 29a and compared with the number in Register 724 using the CJNE instruction, as before. If an inequality is the result of this last comparison by Length Disparity Detector 708, then the next operation comprises calculating the number of characters in Line Remnant 725 (FIG. 3). Otherwise Program 702 calls for the character-by-character comparison (described subsequently with respect to Block 706, FIG. 2) of the contents of Registers 218 and 704 (which also holds the "original" word, it will be recalled) as discussed subsequently.

Assuming the inequality to have been detected, Program 702 requires calculation of the number of characters in the Line Remnant (including punctuation and letter spaces) beyond the right end of the word. The "End-of-the-Word" is identified by the value 732 in an "EOW" pointer 734 which automatically stored the value present in Rescan Pointer 234 when the typist backspaced the cursor (not shown, but known) in Display 16 to the end of the incorrect word (for even to a character within that word) where Auto-Spell Mode was initiated by pressing A-S Key 302 (as stated above and more fully described in Reference III). Therefore, the number of characters in Line Remnant 725 is defined by the difference between the value 732 in EOW Pointer 734 and the value 736 in an Endline Pointer 738 which automatically stores the highest number attained by Rescan Pointer 234 (a value corresponding to the ordinal position in Correction Buffer 54 at which the last character in the Line 15 was entered by the typist—i.e., a character prior to a backspace or other retrograde movement of the print member carrier (the "Daisy") 17 of printer 14—an Endline Pointer usually being present for the known "Relocate" feature of electronic typewriters and thus adaptable to the present invention. Therefore, the number of characters to delete is determined by putting the Endline value 736 from Pointer 738 into Accumulator 29a and the EOW value 732 from Pointer 734 into Rescan Pointer 234, and subtracting the latter from the content of Accumulator 29a in known fashion. The difference value remaining in Accumulator 29a is then decremented to prevent an undesired double-spacing subsequently. The calculated number of characters to delete is then stored in a one-byte Register 740. The characters are then read destructively (i.e. read and then blanked) from Correction Buffer 54 starting at the point designated by the EOW value 732 (previously transferred into Rescan Pointer 234, which is an updown counter). The Daisy position codes (obtained by using a known conversion Table 236) are transferred to Printer 14 in the Erase Mode (controlled by slave Microprocessor 60) such that the selected Daisy character is rotated to the hammer position ("12 o'clock" position—not shown, but known) of Printer 14 and imprinted over the corresponding printed character of Line 15 with the Correction Ribbon 15b raised so as to be interposed between Daisy Wheel 17 and Line 15 on Sheet 15a, Daisy 17 being moved after each character is read and lifted off (or covered over), all in known fashion. Simultaneously, each transferred character is saved by storing in the Buffer 726, identical in length to Correction Buffer 54 and termed the "Zone" Buffer herein (preferably an existing and currently available one—such as, for example, that used in a well-known "Autohyphenation" function of electronic typewriters). The difference value stored in Register 740 is decremented as each character is read out, the "read and delete, yet save" operations 714, 716, and 728-1 terminating when the value in Register 740 is decremented to ZERO.

Following the deletion and storage of the Line Remnant 725, Program 702 begins correction of the incorrect word. To this end a character-by-character comparison of the original and the trial word (in Registers 704 and 218, respectively) is performed using the Character Comparator 706 (preferably the standard compare unit of Microprocessor 24 exemplified by the branch instruction "CJNE") to check for presence of a blank in one or both of the registers and a non-zero character in the other. When this circumstance is found by Comparator 706, finding of which comprises setting the ASCII code 20H for a "blank" into Accumulator 29a and then comparing the value in Accumulator 29a with the successive ones of the register characters, first with the trial word character at the location in Register 218 designated by DPTR 258 and then with the character at the same relative location in Register 704 designated by the address in a Working Register 496 (R1 of Microprocessor 24). If Comparator 706 fails to find a "blank" in either Register 218 or 704, then the respective characters at the designated location in Registers 218 and 704 are compared with each other (the former character being transferred into B register 360 and the latter character transferred into Accumulator 29a for the comparison). If the characters are not equal, bit 7 of the byte in Accumulator 29a is set to a ONE (indicating need for correction of that character, as stated earlier) and the byte in Accumulator 29a then returned to the designated location of Register 704. Following this, the byte in Register 360 is transferred in turn to Accumulator 29a, bit 7 again set to a ONE, and that byte likewise returned to the designated location in Register 218. DPTR 258 and Working Register 496 are then incremented and the above-described comparisons performed on the characters at the next pair of corresponding locations, bits 7 being set to ONE wherever the characters are not equal.

When comparator 706 does find a blank in one register, this is an indication that the end of the word in the one register has been found and that the end of the word in the other register can only be a few characters away at most. To avoid unnecessary comparisons and thus begin the actual correction with little delay, if the "blank" is found first in Register 704 (i.e. the original word is shorter than the trial word), then the Printer Correction Control Routine 702 scans just Register 218 and each additional character thereafter has bit 7 of the byte set to a ONE since the inequality will be found in each case until the blank code following the last character appears. At that point there will be a blank code in both Register 704 and Register 218, indicating that further comparisons are needless. Bit 7 of the blank code in Register 218 is then set to a ONE for a purpose becoming evident shortly.

On the other hand, if a blank code is found first in Register 218 (i.e. trial word is shorter than the original word), the comparisons accordingly continue until a blank code is also found in Register 704. Both Registers 218 and 704 then being blank, further comparisons are again needless. Therefore, Routine 702 jumps to a first scan 720 for a Mark 745 (ONE in bit 7) in successive characters of the Original word with the goal of deleting all characters so marked. Before doing so, it is desirable to point out that successive blanks in Register 218 opposite the terminal non-blank characters in Register 704 will also have their bits 7 set to a ONE. This does not pose a problem, because only the first is needed for the above-mentioned purpose, the others being redundant.

Having found a "blank" in LUD Register 218 (i.e. the end of the trial word) and entered a ONE in bit 7 of that byte, Register 704 is now scanned in the reverse direction for characters marked by presence of a ONE in bit 7, these being characters which differ from corresponding ones in the trial word in Register 218 and thus are the erroneous ones to be deleted. Where a ONE is absent, the address in Working Register 496 is decremented. Current Carrier Position Register 32 is decremented as well, so as to move Daisy 17 to the next previous printing position along Line 15, and so is Rescan Pointer 234, in order to point to the next previous storage byte in Correction Buffer 54, but no other actions take place. Where a ONE is found, however, in bit 7 of the byte of Register 704 designated by the address presently in Working Register 496, that character byte is read out of Register 704 and the 5-bit code in which it was stored is converted to the Daisy position code of Correction Buffer 54 by use of the known conversion Table 236.

Next, the controls in Slave Microprocessor 60 are set to the Erase Mode 728-2 (the suffix number indicating that it is the second in the sequence of operations affecting Printer 14, in accordance with the arrangement established earlier) with the result that Correction Ribbon 15b is again in raised position, interposed between the selected character on Daisy 17 and the corresponding printed character of Line 15. Operation of the known print hammer (not shown) then lifts off (or covers up, as the case may be) the incorrect character marked in Register 704. At the same time, the corresponding character in Correction Buffer 54 is also "blanked", and the Rescan Pointer 234, Current Carrier Position Register 32, and Working Register 496 all decremented once more. The foregoing process is repeated at each character position of Register 704, with a simple carrier move resulting if the byte stored has a ZERO in bit 7, whereas the above-described character deletion cycle in Correction Buffer 54 and on Sheet 15a results if the byte has a ONE in bit 7. The scan for marked characters in Register 704 ends, of course, after checking the first character of the "original" word in Register 704. The first position of Register 704 is detected by use of the count in Char.1 Register 722, decrementing it as each character of Register 704 is checked as to the state of bit 7 therein. The scan therefore ends at the count of ZERO.

The next task is to place the correct characters from LUD Register 218 into the blanked positions of Correction Buffer 54 and Sheet 15a (actually "covered up" positions on Sheet 15a if that type of ribbon is used for Correction Ribbon 15b). The procedure is identical to that for deletion described above except for the facts that (a) the scan is now made with respect to the trial word stored in Register 218, (b) the Slave Microprocessor 60 controls are set to provide the Print Mode 730-3, (the third operation involving Printer 14) the Print Ribbon 15c now being raised to a position interposed between the selected character on Daisy 17 and the position in line 15 previously blanked by the above-described deletion of the corresponding character in Register 704, (c) the scan is again reversed, being made in the forward direction once more, and (d) termination of the scan occurs upon detection of a blank code associated with a ONE in bit 7. As will be recalled the change in content of the last mentioned bit 7 took place when character Comparator 706 found a "blank" code in Register 218 during the process of marking disparate characters (operation 710 in FIG. 2). The circumstances of exception d) above therefore signal that all replacement characters from the trial word in Register 218 have been entered and printed respectively in their proper positions in Correction Buffer 54 and on Line 15. Hence, the characters of Line Remnant 725, previously described (operation 716 of FIG. 2) as having been deleted successively from Correction Buffer 54 and Line 15 while being simultaneously stored—likewise successively—in Zone Buffer 726, may now be recalled as indicated by Block 718 of FIG. 2.

Accordingly, the Slave Microprocessor already being set to provide printing of replacement characters, the fourth and last sequence (730-4 in FIG. 2) involving Printer 14 proceeds immediately with read out of the contents of Zone Buffer 726 byte-by-byte (in known first in-first out fashion, including all punctuation symbols originally present). Each successive character is simply transferred to Correction Buffer 54 in known fashion, there being no need of code conversion because the characters are still in Daisy Position form. At the same time the daisy position or other information is sent to Slave Microprocessor 60 via input line 58 and then on to Drivers 72 and Printer 14 via lines 70a, 70b to reprint each character of Line Remnant 725 in alignment with the accepted word just printed correctly on Line 15.

To illustrate the invention better, an example will now be described on the basis of FIGS. 3 and 4. As seen in FIG. 3, an operator (a fast typist but obviously poor speller) enters the words "kwestionn the basis" on Line 15 via Keyboard 10, Alarm Device 19 emitting its warbling signal at entry of the third character (an "e"), but the entire incorrect word plus two additional words ("Line Remnant" 725) being entered and printed on Line 15 of Sheet 15a because of reaction time (or inattention). Then, following the teachings of Reference III, say, the Backspace Key 20BS of Keyboard 10 is pressed a number of times to bring the Daisy 17 (not shown in FIG. 3) from position 41 of Current Character Position Register 32 (to which Daisy 17 was moved after printing the last character—an "s") to position 31 of Register 32, the space indicating the end of the incorrect word. At that point the operator presses A-S Key 302 to develop the most likely alternative according to the Auto-Spell Mode 300 of Reference III. As a result, "kwestionn" is corrected to "question", a valid word in the list of Dictionary 56, the corrected word being stored in Register 218 and presented in Display 16. Upon viewing the word in Display 16, it is assumed the operator recognizes it as the intended word and therefore presses Return Key 20R to provide a corrected record in Correction Buffer 54 and Sheet 15a, including properly aligned characters of Line Remnant 725 according to the invention herein.

Therefore, upon pressing Return Key 20R, Print Control 700 begins a scan of Template Register 344 (which also contains the incorrect word), using Comparator 706 to determine whether each character (k . . . n) is a Null (or ZERO) character and incrementing B Register 360, if not. Note that the figure under each character in the registers of FIG. 4 indicates the total number of incrementations up to that point and that when the comparison finds a Null (an equality being the result), that total will be equal to the number of letters in the word (e.g. 9 letters in "kwestionn"). The value "9" in B Register 360 is then transferred to Char. 1 Register 722. In similar fashion, the accepted trial word in Register 218 is scanned for a Null character using Comparator 706 and again incrementing B Register 360 as each character (q . . . n) is compared until an equality is the result of the comparison. When that occurs, the count "8" in B Register 360 is transferred to Char. 2 Register 724. Next, the contents of Registers 722 and 724 are compared using Comparator 706 and because an inequality exists, the value "31" in EOW pointer 734 is subtracted from the "41" in Register 32. That difference is then stored in Register 740. Accordingly, those ten characters are read out of Correction Buffer 54 one-by-one, beginning with the space at 31, and both erased from Line 15 by being printed over the corresponding character through Correction Ribbon 15b and also stored in Zone Buffer 726, both in known fashion. As each character is read, Register 740 is decremented and when its value becomes ZERO, the deletion operation terminates, as stated previously, the words "the basis" (725 in FIG. 3) no longer being visible, and codes for the characters of those same words together with the initial and intervening codes for the corresponding spaces 742, 743 in Line Remnant 725 having been deleted from Correction Buffer 54.

Following the above, Daisy 17 is returned to EOW position "31" by virtue of that number being the value 732 stored in EOW Pointer 734 as is known. Rescan Pointer 234 is similarly set to point to the corresponding position in Correction Buffer 54. Thereupon, Routine 702 begins a reverse scan of Register 704, seeking those characters having a Mark (the ONE in bit 7 identified symbolically in FIG. 4 by a diagonal 745 at upper left in the byte at that location—namely, bytes 746, 747 and 748 for the incorrect characters k, w and n at locations 22, 23 and 30 of FIG. 3). Accordingly, as each of these bytes is detected as bearing the Mark 745, beginning with the "n" 748, then the corresponding byte in Correction Buffer 54 is blanked in known fashion (by writing the blank Code 68H, for example). At the same time, Daisy 17 is backspaced step-by-step to each print position starting with the "30" in Register 32, where Mark 745 in the "n" byte 748 is detected and the "n" code sent (shown symbolically in FIG. 2 by AND gate 752 connecting the "Mark" output line 753 of "Scan for Mark" Block 720 and the Read output 755 of Register 704 to Erase Mode Block 728-2). Daisy 17 is also rotated to place the petal (not shown, but known) bearing the appropriate letter over the corresponding character on Line 15 and the known print hammer activated to lift off the imprint, say, because of the interposed Correction Ribbon 15b provided by the Erase Mode Block 728-2. Where the byte does not contain a mark 745, Routine 702 merely backspaces Daisy 17 to the next lower character position on line 15, Register 32 being decremented in keeping with that move (shown by the "No Mark" output on line 764).

Having cleared the n, w and k in that order, Routine 702 now scans Register 218 for bytes having the Mark 745 just as above, and detects the "q" 750 and then "u" 751, the Daisy Codes for which are read, converted from ASCII code (the form in which they are present in Register 218) using a conversion Table 754 similar to Table 236, and sent to the appropriate position of Correction Buffer 54 determined by the address in Rescan Pointer 234 (incremented once for the "u," of course). Likewise, Slave Microprocessor 60 has positioned Daisy 17 laterally in accordance with the "22" in Register 32 (as was required to lift off the "k"), and rotated Daisy 17 to bring the letter "q" over the blank spot 22 on Line 15 previously occupied by the "k." The Mark 745 causes the code in the designated byte 750 to be read and sent (shown symbolically by the "AND" gate 756 connecting the "Mark" Output 753a of "Scan for Mark" Block 720 and the READ output 758 of Register 218 to Print Mode 730-3). As previously stated, this last interposes Print Ribbon 15c between Daisy 17 and Sheet 15a to print the selected letters "q" and "u" in succession at the now blank letter spaces at positions 22 and 23 on Line 15.

After printing the q and the u as above-described, absence of Marks 745 in the remaining bytes (shown symbolically as before in FIG. 2 by the "No Mark" output on line 759 to the "Move Carrier Only" Block 760 in FIG. 2) increments DPTR 258 as each byte is unsuccessfully scanned for a Mark 745 until the blank byte 762 is reached. There, the conjunction of Mark 745 and the blank code (both detected in known fashion) signals completion of correcting the incorrect word into conformity with the accepted trial word.

As a final step in the print correction with automatic realignment of Line Remnant 725, this last is immediately recalled character-by-character from storage in Zone Buffer 726 and transferred to Correction Buffer 54 at the position immediately following the last character (i.e. the second "n" at the position in Register 704 corresponding to decrementation of Register 496 from "8" to "7," which "n" was not deleted for this particular example, but merely skipped by decrementing Rescan Pointer 234). The printed "n" at location "29" on Line 15 (FIG. 3) was also skipped over at that time.

Simultaneously with the transfer to Correction Buffer 54, the Daisy position code is also transferred to Slave Microprocessor 60 to provide for reprinting on Line 15 in known fashion by interposing Print Ribbon 15b between Daisy 17 and the blanked area on Line 15 previously occupied by Line Remnant 725. The characters in "the basis" are thus each shifted left one position because of prior deletion of the "n" byte 748 in Register 704 due to the Mark 745 present in that byte.

I claim:

1. In an electronic typewriter of the kind having operator input of text through a keyboard with a plurality of depressible keys, a memory, a printer for producing an output legible by the operator, the output including thereon a discrete line having an undesired word and one or more characters subsequent thereto; said memory including a correction buffer register storing in identical order corresponding data for all information appearing on the discrete line, including at least the characters of the undesired word, and the one or more characters subsequent thereto; a word list stored within the memory, controls in the typewriter for producing from the undesired word a properly-spelled trial word based on the word list, and a display presenting the trial word; the improvement combining therewith a fully automatic print correction control comprising:

(a) means activating said print correction control in response to said operator's single, momentary pressing of a particular one of the depressible keys, said pressing indicating acceptance of said trial word as replacement for said undesired word, (b) a further register in said memory storing the characters of said trial word, (c) means cooperating with characters stored in said registers for developing individual length information for said undesired word and for said trial word in response to activation of said print correction control, (d) comparison means operating on said individual length information for sensing existence of a length disparity between said undesired word and said trial word, (e) means for issuing a first electronic signal in response to sensing said existence of a length disparity, (f) a character position counter associated with said printer, a first count in said counter defining an end-of-word position related to said undesired word, and a second count therein defining an end-of-line position related to a last of said one or more characters, (g) calculating means generating a difference value between said first and second counts for determining the quantity of characters subsequent to said undesired word, said calculating means operating in response to issuance of said first electronic signal, (h) means associated with said printer and said buffer register for erasing successively from said legible output said one or more characters subsequent to the undesired word, said means for erasing utilizing said corresponding data in said buffer register for control of said character selection means, (i) means responsive to said difference value for controlling the number of erasures performed by said means for erasing, (j) a temporary register in said memory, (k) means for transferring said corresponding data for each character of said one or more characters from said buffer register into said temporary register simultaneously with erasure of said each character from said legible output by said means for erasing, (l) means for issuing a second electronic signal in response to performing said number of erasures, (m) amending means activated automatically in response to said second signal, said amending means changing said undesired word on said legible output into conformity with characters, including blank spaces, at corresponding positions in said further register storing said trial word;

(n) means for detecting the end of the trial word in said further register, (o) means for issuing a third electronic signal in response to detecting said end of the trial word, (p) means to recall each of said one or more characters sequentially from said temporary register and print each thereof automatically on said legible output in response to said third signal and in proper alignment with the trial word thereon.

2. The electronic typewriter of claim 1, wherein said amending means includes a special means operable to detect and indicate disagreement between any characters of said undesired word and corresponding characters of said trial word, said amending means when activated changing characters of said undesired word in said legible output solely in response to indication of said disagreement by said special means.

3. The electronic typewriter of claim 2, wherein said special means comprises a comparator, and further including an ordinal position counter to designate like-positioned characters of said trial word and said undesired word, said special means utilizing said comparator for character-by-character comparison of said trial word and said undesired word under control of said ordinal position counter, said ordinal position counter being incremented after each comparison.

4. The electronic typewriter of claim 3, wherein said special means further includes marker means associated with each character of said undesired word and said trial word, presence of a marker therein indicating said disagreement between a character of said undesired word and the corresponding character of said trial word at any point in said comparison.

5. The electronic typewriter of claim 4, wherein presence of said marker in a character of said undesired word controls erasure from said legible output of the character having said marker therein, and presence of said marker in the corresponding character of said trial word controls recording of said corresponding character by said printer in place of the erased character of the undesired word.

6. The electronic typewriter of claim 1 wherein said word list is a spelling dictionary, and further including an error indicator activated upon first entry of an erroneous character of said incorrect word, and special key means in said keyboard, together with additional means operable to produce said trial word from said dictionary based on characters in said incorrect word, said additional means being responsive to pressing of said special key means subsequent to activation of said error indicator.

7. The electronic typewriter of claim 6, wherein said legible output is a sheet bearing a printed record of said incorrect word, said printer comprises correction members for erasing text characters from said sheet; said amending means includes a comparison means operable to detect and indicate disagreement between any characters of said incorrect word and corresponding characters of said trial word, said incorrect word is located within a string of valid words also characters of said incorrect word, including said erroneous character, indicated by said comparison means to be in disagreement and, further including means for detecting completion of erasure of all characters of said incorrect word indicated to be in disagreement and for issuing a fourth electronic signal upon detection of said completion, said amending means operating automatically in response to said fourth signal to cause the printer to imprint in place of the erased ones of the characters of the incorrect word, those characters of the trial word indicated by said comparison means to be in disagreement.

8. The electronic typewriter of claim 1, further including an index key on said keyboard for producing from said incorrect word a succession of said trial words upon each pressing thereof, each trial word produced by pressing said index key being presented on said display; and wherein said further register stores only the characters of the trial word currently presented in said display, said incorrect word and one or more characters subsequent thereto in said output terminate a current line of text input, said means for sensing a length disparity comprises counting means for determining respectively the number of characters in the incorrect word and the number of characters in the trial word present in said further register when said particular one of said depressible keys is pressed, and a comparator for comparing said number of characters in said incorrect word and in said trial word, said comparator producing an inequality signal as said first electronic signal upon comparison of non-identical numbers of characters to indicate existence of said disparity;

said calculating means are activated in response to production of said inequality signal, said means for erasing comprise cyclic means operable in a predetermined number of cycles preset equal to said difference value, and said second signal for activating said amending means is issued after said predetermined number of cycles.

9. In an electronic typewriter of the kind having operator input of lines of text through a keyboard with a plurality of depressible keys, a memory, a text recording unit having a printed output legible by the operator, the output including thereon a discrete line having an incorrect word and one or more characters of a valid word subsequent thereto, a last of the one or more characters terminating a current line of text input; said memory including a correction buffer register storing in identical order, corresponding codes for all characters appearing on the discrete line of the printed output, including at least the incorrect word and the one or more characters subsequent thereto; a spelling dictionary stored within the memory, an error indicator activated immediately upon entry of at least one erroneous character forming the incorrect word, controls in the typewriter for producing from the incorrect word a properly-spelled trial word based on the spelling dictionary, and a display; the improvement comprising combination therewith of:

(a) special key means included in said keyboard, (b) means for producing a trial word from said spelling dictionary based on characters in said incorrect word preceding said erroneous character, said producing means being activated in response to pressing of said special key means subsequent to activation of said error indicator, (c) means for presenting said trial word in said display, (d) a fully automatic print correction control activated in response to said operator's single, momentary pressing of a particular one of the keys, said pressing indicating acceptance of said trial word presented in the display as replacement for said incorrect word, (e) respective registers in said memory having a plurality of positions for storing codes for characters of said trial word and of said incorrect word, (f) character count means cooperating with said codes stored in each of said respective registers for developing individual character counts for said incorrect word and for said trial word in response to activation of said print correction control, (g) means comparing said individual character counts for sensing the existence of a length disparity between said incorrect word and said trial word, (h) means for issuing a first electronic signal in response to sensing said existence of a length disparity.

(i) a character position counter associated with said printed output, a first count in said counter defining an end-of-word position related to said incorrect word, and a second count therein defining an end-of-line position related to a last of said one or more characters, (j) calculating means for generating a difference value between said first and second counts for determining the quantity of characters subsequent to said incorrect word, said calculating means operating in response to issuance of said first signal, (k) erasing means associated with said text recording unit and said buffer register and operable in response to generating said difference value, said erasing means successively removing from said printed output said one or more characters subsequent to the incorrect word under control of said corresponding codes in said buffer register, (l) a temporary register in said memory, (m) means for transferring said corresponding codes for each of said one or more characters into said temporary register simultaneously with erasure of each said character from said printed output by said erasing means, (n) means for issuing a second electronic signal in response to erasure of a number of characters equal to said difference value, (o) comparing means for comparison of characters of said incorrect word with corresponding characters of said trial word to indicate any disagreement therebetween, including characters causing said length disparity, said comparing means being activated automatically in response to said second signal, (p) means for issuing a third electronic signal in response to presence of blank codes at corresponding positions in said respective registers, (q) amending means activated automatically in response to said third signal for removing from said printed output solely said erroneous character and any characters indicated by said comparing means as being in disagreement and for replacing the removed characters with corresponding characters of the trial word, to conform thereby said incorrect word to the trial word; and (r) means for detecting the end of the word in the one of said respective registers storing said trial word, (s) means for issuing a fourth electronic signal in response to detecting said end of the word in the register storing the trial word, (t) means for recall of said corresponding codes for each of the one or more characters sequentially from said temporary register and supply thereof to said text recording unit for placement of the one or more characters automatically at corresponding positions on said printed output in response to said fourth signal and again in proper alignment with said trial word thereon.

10. The electronic typewriter of claim 9, further including an ordinal position counter to designate like-positioned characters of said trial word and said incorrect word, for character-by-character comparison of said trial word and said incorrect word under control of said ordinal position counter, said ordinal position counter being incremented after each comparison.

11. The electronic typewriter of claim 10, wherein said comparing means further includes marker means associated with each character of said incorrect word and said trial word, presence of a marker therein indicating said disagreement between a character of said incorrect word and the corresponding character of said trial word at any point in said comparison.

12. The electronic typewriter of claim 9, wherein said text recording unit is a printer, said printed output is a sheet bearing a printed record of said incorrect word, said printer comprises correction members for erasing text characters from said sheet; and in response to said third signal, said amending means cause said correction members of the printer to erase automatically from the sheet the characters of said incorrect word, including said erroneous character, indicated to be in disagreement by said comparing means, and further including means for issuing a fifth signal in response to completion of erasure of all said characters of the incorrect word indicated to be in disagreement, said amending means in response to said fifth signal then automatically causing the printer to imprint, in place of the erased characters of the incorrect word, the characters of the trial word indicated to be in disagreement by the comparing means.

* * * * *